(No Model.)
J. N. HURTY.
PROCESS OF MANUFACTURING STARCH.
No. 395,977. Patented Jan. 8, 1889.
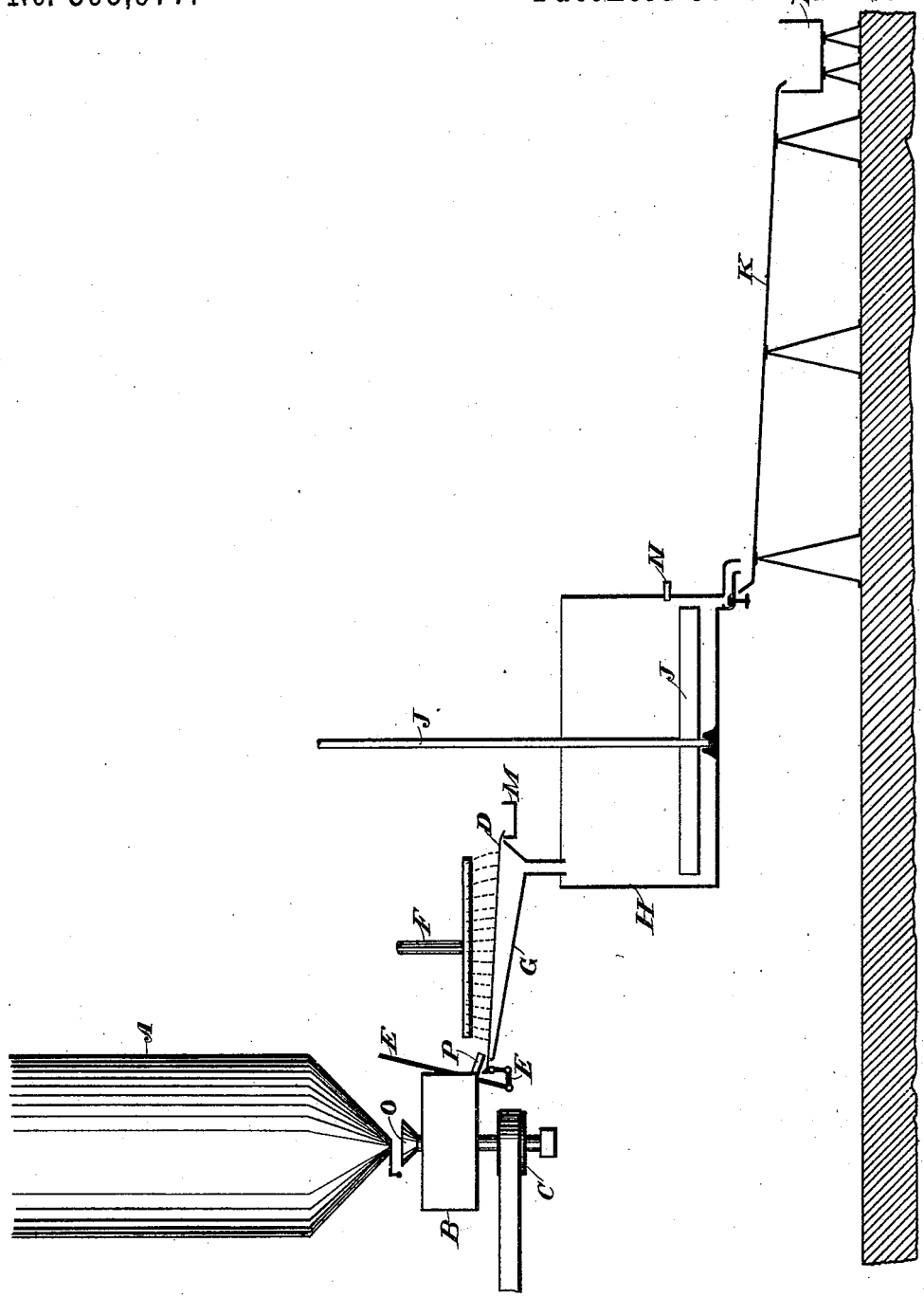
WITNESSES:
INVENTOR.
John N. Hurty
BY
W. H. Kenyon
ATTORNEY.

UNITED STATES PATENT OFFICE.

JOHN N. HURTY, OF INDIANAPOLIS, INDIANA.

PROCESS OF MANUFACTURING STARCH.

SPECIFICATION forming part of Letters Patent No. 395,977, dated January 8, 1889.

Application filed February 21, 1888. Serial No. 264,824. (No specimens.)

*To all whom it may concern:*

Be it known that I, JOHN N. HURTY, a citizen of the United States, residing at Indianapolis, in the county of Marion and State of Indiana, have invented certain new and useful Improvements in the Process of Manufacturing Starch, of which the following is a specification.

This invention relates to the manufacture of starch from maize or Indian corn and other similar starch-bearing grains, in which the starch is found naturally associated with gluten and other impurities, from which it must be separated, its object being to shorten the time necessary to effect such separation, to secure a greater yield of starch than has heretofore been obtained, to keep sweet and wholesome the starch produced as well as the by-products, to produce a neutral starch free from injurious chemicals, and to economize in the cost of the agents employed; and it consists in the process herein described and claimed.

Heretofore in the most common processes of starch-manufacture the agents employed for the separation of the impurities and starch have been acids or alkalies. In some cases the acid has been produced from the grain itself by fermentation, as in the "sour" process, and in others the acids have been added during the process of manufacture. The alkalies are of course always added. In order that my process may be fully understood and the differences between it and those heretofore employed clearly distinguished, I will describe the starch as it exists in natural associations, and also the processes of separating it from the grain. Maize and other cereal grains are composed of starch, gluten, cellular matter, oil, a certain amount of mineral matter, and of water. It is customary in starch-manufacture to soak the maize or grain before grinding, as it grinds more easily after soaking. After grinding the crushed grain is passed over "shakers" or sieves, and the finer part, containing most of the starch, is sifted away from the coarser part, called "bran" or "feed." Now, this coarse part is composed mainly of the cellular matter of the grain, although it also contains some of the other constituents. It is usually used for cattle-feed. The finer part contains the major portion of the starch and also of the gluten and oil. The mineral matter of the grain is mainly dissolved by the water used so copiously in starch-manufacture. The finer part before mentioned, that is sifted through the shakers, is accompanied by considerable water, which holds it in suspension, and it contains all the starch that is to be gotten during the subsequent steps of starch-manufacture. The separation of the starch from the impurities in this finer part constitutes the most important work of starch-making, and in the manufacture of starch from maize and other cereal grains is accomplished by various methods of flotation. The starch has a density or specific gravity of about 1.50, the gluten a density of about 1.35, and the oil about .94. Hence it will be readily seen that if these substances be suspended in water and subjected to flotation the starch will settle first; but in manufacture it is found that if the grain be ground while in a sweet condition and the sifted part subjected to flotation in water the entire solid contents of the sifted liquid will deposit together in a doughy mass. This is owing to the adhesive nature of the starch-granules, which refuse to separate from the impurities, and hence carry them down.

As starch occurs in nature it is composed of an internal soluble substance called "granulose" surrounded by an insoluble envelope or covering of what is termed "amylo-cellulose" or "starch-cellulose." Now, in potatoes or other similar tubers the starch is composed only of the above-named parts; but in maize or Indian corn, or other cereal grains where the starch is associated with gluten, the outer envelope of amylo-cellulose is covered with a thin layer of a substance which is adhesive or sticky when wet. This adhesive coat causes the starch-granules to stick to the impurities which accompany it in the sifted portion of the grain before described, and even after chemical treatment enough of this coat remains to cause the starch-granules of cereal grains to stick together in drying, and hence to dry in columnar masses, technically known as "crystals." (Of course potato starch or the starch made from similar tubers does not so dry, but remains in a more or less pulverulent condition.)

If the adhesive coat of the starch-granules of maize or other cereal grains be removed or rendered non-adhesive, it is evident from the foregoing descriptions that it can be separated from the gluten and oil with great ease on account of its greater density. To overcome this adhesiveness there have heretofore been used acids and alkalies, which, by their violent action, dissolve or tear away part or all of the adhesive coating. In the oldest process the maize or other grain was fermented by long steeping in hot water, usually five days or more, during which fermentation or "souring" lactic acid and other products were formed from the starch and gluten. The lactic acid reacted on the starch-granules, partly removing the adhesive coat, and it also dissolved considerable of the gluten. The maize or other grain was then ground, and the ground mass passed over sieves sprinkled with water, whereby the starch and finer part of the crushed grain were sifted through and the bran or "feed" tailed off the end of the shakers to be used as cattle-feed. The finer portion as thus obtained was of course accompanied with considerable water, and it was carried to "runs" or inclined planes and allowed to flow down these planes or runs, whereby the starch settled in a more or less firm mass on the bottom of the runs, and the gluten and oil floated away and tailed off the runs, to be carried away to be used as cattle or hog feed. The starch was then removed, molded, and dried, as is now practiced.

More modern processes have been advanced of adding mineral acids to the sifted grain, instead of developing the acid by fermentation, and these processes are of greater advantage than the sour process, as they do not require long steeping; but, like the sour process, the acids impair the quality of the starch and partially remove the adhesive coat of the granules.

Another process now largely used and of greater value than either the sour or "acid" processes is the "alkaline" process, in which caustic soda is added to the grain, whereby the adhesive coating of the starch-granules is dissolved and also most of the gluten. This process requires only two or three days' soaking or steeping of the grain, and hence the grain is comparatively sweet when ground. The grain, after steeping, is ground as in the sour process, then likewise passed over shakers or sieves sprinkled with water, and the tailings used as cattle-food. The finer part that sifts through the meshes of the sieves is, as usual, accompanied with considerable water, and is not carried to the inclined planes or runs immediately, but is carried to vats or settling-tubs and allowed to subside. The solid matter sinks to the bottom and clear water remains above. This water is withdrawn and a solution of caustic soda added. This has the effect of dissolving the greater part of the gluten and oil and also the adhesive envelopes of the starch-granules, and hence when the liquid is put over the starch planes or runs the starch settles in a firm mass on the bottom and the impurities are floated away. Instead of caustic soda other alkalies or alkaline substances have been sometimes used, such as potash and soda-ash, carbonates of soda and potash, (commercially known as "sal-soda" and "sal-tartar,") and lime. These substances are sometimes used alone, sometimes together, or in conjunction with neutral salts; but caustic soda is the most largely used, as it gives a larger yield of starch and the starch is purer than when lime or alkaline carbonates are used. The use of any of these substances gives an alkaline starch and forms only a modification of the alkaline process.

It may be added here that no chemicals are needed to purify the starch from potatoes or similar tubers, nor do I claim for my process that it is of any value in making such starch, because that kind of starch is non-adhesive, and hence settles free from impurities, and, moreover, the impurities found in such substances are all soluble. Therefore water alone will remove them, leaving the starch pure.

The before-mentioned processes are objectionable for many reasons. The sour process is objectionable on account of the foul odor generated by the fermentation, which makes every sour-starch works a nuisance to the community adjacent, and which clings to every product of such works, and because of the great loss of starch which occurs by changing to lactic acid by fermentation and the foul stench which accompanies the "slop" or offal. The fermentation also results in the general loss of the substance of the grain by passing into soluble products of no value as feed.

The other acid processes are objectionable on account of the injury to the machinery and appliances of the works by the acid liquors or vapors, the acid character of the starch produced necessitating additional expense to neutralize it, (and if it is not neutralized the liability of the starch to become moldy is increased,) the alteration in character of the starch and the loss caused by part of it being changed to glucose by the acids, and because of the character of the slop or offal, which is, without previous preparation, unfit for hog or cattle feed. In the acid processes where sulphurous acid is used there is the additional objection of the injury to the workmen by the noxious acid-vapors which are inevitably present. The alkaline process is objectionable because of the great cost of the alkali necessary to purify the starch, the alkaline character of the offal, which prevents its full value being obtained as cattle-feed, and the alkaline character of the starch produced, rendering it unfit for use in many manufacturing operations, and also because of the loss of starch by the action of the alkali.

My process is free from these objections, for in my process neither acid nor alkaline substances are used, and at the same time it gives the maximum yield of neutral starch of a high grade of purity at the lowest possible cost, besides leaving the feed and offal or slop in a sweet and nutritious condition fit for immediate use as cattle and hog feed.

The accompanying drawing represents diagrammatically an apparatus of common form which may be advantageously employed in practicing my process in the preferred way.

In said drawing, the portion marked A represents the vat for steeping the maize or grain; B, the mill for grinding the same; C, a pulley by which the same is operated; D, a shaker for sifting the ground grain; E, the apparatus for operating the shaker; F, a sprinkler for sprinkling the ground grain as it passes over the sieves; G, a trough for receiving the sifted portion; H, a vat in which the starch liquor or "milk" is allowed to settle; J, an agitator or stirrer for mixing the contents of the vat H; K, the starch planes or runs where the starch is deposited; L, a spout or conveyer which receives the slop or by-products; M, a conveyer for receiving the tailings or feed that will not pass through the shaker; N, the faucet or plug to the vat H, through which the supernatant water is drawn off; O, the hopper to the mill B, and P the spout where the ground grain issues from the mill.

I will now describe my process, which I have denominated the "sweet" process, as I prefer to practice it, and give the rationale therefor. I steep or soak maize or Indian corn or other cereal grain in water at a temperature of about 130° Fahrenheit for from eighteen to twenty-four hours. It may be steeped longer or at other temperatures, but must not be allowed to perceptibly ferment. I then grind the steeped grain in a burr or other kind of mill, running into said mill a stream of water to facilitate the grinding and delivery of the grain therefrom, as is usual in starch-works. The ground maize or grain is then passed over sieves or shakers and sprinkled with water, as is usually practiced in starch-works, and the feed that tails off the shaker can be carried away to be used for cattle-feed. The finer part that sifts through the shaker-cloth is carried to suitable settling-vats. In order to get the highest yield of starch it is necessary to sprinkle the ground grain with more water on the shaker than is afterward desirable to pass over the runs or starch-planes. The liquid that sifts through the shaker-cloth, carrying the finer part of the grain, is therefore allowed to rest in the settling-vats, whereby the starch and impurities settle together to the bottom and clear water remains above. This supernatant water is then drawn off, so as to leave a measure of about twenty-five gallons of sediment and water per bushel of maize or grain, which is then stirred up, and will give a milk of a density of about 1.06. I now add to this milk one and two-thirds gallon of a ten-per-cent. solution of chloride of sodium (or one and one-third pound of chloride of sodium may be added in substance) per bushel of grain. I now agitate the mixed "starch-milk" and chloride-of-sodium solution together for about twenty minutes and then add water to make a total measure of about thirty-three gallons per bushel of the maize or grain. The milk will then have a density of about 1.045. It may now be passed over the starch planes or runs, and the starch will deposit out of the treated milk in a state of perfect purity with great ease, while the gluten and other impurities will float away, sustained by the solution of chloride of sodium, which has a density considerably in excess of that of water. The gluten or slop may be used for hog or cattle feed. After the starch has been deposited on the runs or starch-planes it may be removed and carried through the usual subsequent operations of starch-manufacture—such as molding, draining, crusting, scraping, and finally drying.

The rationale of my process is as follows: As before stated, the starch-granules of maize or Indian corn and other cereal grains, where the starch-granules are naturally associated with gluten, are covered with a coating that is adhesive when wet. Acids or alkalies partially or wholly remove this coating, and hence deteriorate the quality of the starch, as adhesiveness is one of the most valuable characteristics of starch. The other disadvantages of acids and alkalies have already been noted. I have found that this adhesive coating can be rendered non-adhesive by adding chloride of sodium in sufficient quantity to the starch-liquor from unfermented grain, and I have also found that the chloride of sodium does not remove or dissolve any of the adhesive coating or permanently alter it, but only renders it non-adhesive while it is present in the starch-liquor; hence its action is only temporary, and after the starch has been deposited on the runs or starch-planes and the impurities floated away the chloride of sodium may be washed out by water, and the starch will then return to its natural adhesive condition. The action of this coating of the starch-granules seems to be somewhat analogous to that of gelatine, for the coating is soluble in the presence of acids or alkalies, and also in hot water, and is insoluble in cold water; but in the latter case it swells up and is adhesive. If chloride of sodium be added to the cold water in proper quantity, the coating will contract and slightly harden and will become non-adhesive. If now the chloride of sodium be washed out by fresh cold water, the coating will soften and swell up to its former size and become again adhesive, as before. It will be seen that the process of temporarily rendering the coating non-adhesive is the only one that enables the impurities to be removed from the starch and yet leave the starch in the same condition as it exists in the maize and other grain, retaining all the advantages that the starch of cereals possesses over other starches.

The importance and value of preserving the adhesive coatings of the starch-granules intact will be evident from the consideration that the quality of adhesiveness is of the first importance in most of the uses of starch and from the further consideration that the adhesive coating by its presence protects the starch-granules from exosmosis, and so from shriveling and drying up.

The starch after depositing on the runs is, in ordinary starch-manufacture, always mixed with water, in order to transfer it to the molding-boxes or settling-cisterns. So it will be seen that no departure from the ordinary process of manufacture is necessary to completely restore the starch to its natural and normal condition.

The quantity of chloride of sodium used in the manufacture may be varied within wide limits without departing from my invention, and the starch-milk made of variable densities, according to the pleasure of the operator; but the quantity and density I have named have been found to be most efficacious, more of the chloride of sodium adding nothing to the process and less of it preventing the full control of the flotation which is desired on the starch-planes. The chloride of sodium may also be added before the grain is sifted or during the steeping; but I prefer to add it after the grinding and sifting, because it requires less of the reagent, while the quantity may be more accurately known and regulated, besides which in this way the major portion of the feed is not at all affected by the reagent, as it is separated before the mixing takes place.

I have found by experience that a solution density of 1.0033 in starch-milk gives the required control of flotation on the starch-planes, and, as I make the starch-milk equal thirty-three gallons per bushel of maize or grain in the preferred way of practicing my process, it will take one and one-third pound of chloride of sodium to give with this measure the desired solution density of 1.0033. The slop or gluten that tails off the ends of the starch planes or runs can be used for cattle or hog feed immediately, as before stated. Each barrel of it contains the product of about two and one-fourth bushels of grain, and, if desired, may be condensed by draining to a solid mass, as it has not the stickiness that the product from other processes has, and hence drains easily. It contains a small quantity of chloride of sodium, which is found beneficial to hogs or cattle, improving their condition.

The advantages of my process, as will be readily seen, are the short time necessary for the operation, the large yield of starch obtained, the extreme economy in the cost of reagents, the sweet character of the starch produced, the strength and beauty of this starch and its freedom from injurious chemicals, the nutritious character of the by-products and their freedom from injurious substances, and the fact that the solid matter originally present in the maize or other cereal grain is preserved, because no fermentation has taken place at any stage of the process. The chloride of sodium also gives a better control of the flotation of the impurities than has heretofore been obtained, and confers another property of great value in starch-manufacture, it being an antiseptic, which assists in maintaining the starch and by-products in a sweet condition as long as it is present. It may also be observed that there can be no offensive odor or injury to workmen or machinery when this process is used.

Having thus fully described my said invention, what I claim as new, and desire to secure by Letters Patent, is—

1. The process of manufacturing starch, substantially as described, which consists in subjecting the maize or other cereal grain in a substantially unfermented condition to the action of chloride of sodium and separating the gluten and other impurities therefrom by flotation.

2. The process of manufacturing starch, substantially as described, which consists in first steeping, grinding, and sifting the maize or other cereal grain, and then subjecting the starch-liquor in a substantially unfermented condition to the action of chloride of sodium and separating the gluten and other impurities therefrom by flotation.

3. The process of manufacturing starch, which consists in first steeping the grain a sufficient length of time to soften but not perceptibly ferment it, then grinding it, then sifting it under a flow of water through sieves or screens, whereby the starch and finer particles are precipitated into vats and the coarser products run off untreated to be used for feed, then, after the starch has settled, drawing off the supernatant water until the liquid remaining is equal to about twenty-five gallons for each bushel of grain originally used, then adding chloride of sodium either in solution or otherwise, substantially as described, then mixing the starch-milk so treated thoroughly, then adding thereto sufficient water to make the whole quantity about thirty-three gallons for each bushel of grain, and then separating the starch from the other ingredients by settling or passing over runs and floating the by-products away, substantially in the manner described.

In witness whereof I have hereunto set my hand and seal, at Indianapolis, Indiana, this 16th day of February, A. D. 1888.

JOHN N. HURTY. [L. S.]

Witnesses:
E. W. BRADFORD,
W. E. DEVORE.